United States Patent
Feng

(10) Patent No.: US 9,948,051 B2
(45) Date of Patent: Apr. 17, 2018

(54) WELDING TRAY

(71) Applicant: ZTE Corporation, Shenzhen (CN)

(72) Inventor: Yuwen Feng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/107,535

(22) PCT Filed: Jul. 2, 2014

(86) PCT No.: PCT/CN2014/081508
§ 371 (c)(1),
(2) Date: Jun. 23, 2016

(87) PCT Pub. No.: WO2015/096446
PCT Pub. Date: Jul. 2, 2015

(65) Prior Publication Data
US 2016/0322768 A1     Nov. 3, 2016

(30) Foreign Application Priority Data

Dec. 23, 2013   (CN) ..................... 2013 2 0854559 U

(51) Int. Cl.
*B23K 37/04*     (2006.01)
*H01R 43/02*     (2006.01)
(Continued)

(52) U.S. Cl.
CPC ......... *H01R 43/0263* (2013.01); *B23K 1/085* (2013.01); *B23K 3/08* (2013.01);
(Continued)

(58) Field of Classification Search
CPC ..... B23K 37/04–37/0538; B23K 3/087; B23K 3/08; B23K 1/085
(Continued)

(56) References Cited

U.S. PATENT DOCUMENTS 2,365,226 A * 12/1944 Stout ...................... B23K 9/035
219/160
3,624,341 A * 11/1971 Hazelhurst .......... B23K 9/0026
219/105
(Continued)

FOREIGN PATENT DOCUMENTS

CN            2537648 Y     2/2003
CN          201073727 Y     6/2008
(Continued)

OTHER PUBLICATIONS

International Search Report for corresponding application Application No. PCT/CN2014/081508 filed on Jul. 2, 2014; dated Oct. 10, 2014.

*Primary Examiner* — Kiley Stoner
(74) *Attorney, Agent, or Firm* — Cantor Colburn LLP

(57) ABSTRACT

The embodiments of disclosure disclose a welding tray, which includes a tray frame (18) and a supporting device (16), wherein the supporting device (16) includes a supporting component and an adjustable connecting component, the supporting component includes a supporting surface, the adjustable connecting component connects the supporting component to a side edge of the tray frame (18), and a distance between the supporting surface and a bearing surface of the tray frame (18) is adjustable.

8 Claims, 6 Drawing Sheets

(51) Int. Cl.
*B23K 1/08* (2006.01)
*B23K 3/08* (2006.01)

(52) U.S. Cl.
CPC .............. *B23K 3/087* (2013.01); *B23K 37/04* (2013.01); *B23K 37/0461* (2013.01); *H01R 43/0256* (2013.01)

(58) Field of Classification Search
USPC .......... 228/212–213, 44.3–49.6; 219/121.58, 219/158–161, 521
See application file for complete search history.

(56) References Cited

U.S. PATENT DOCUMENTS

| | | | | |
|---|---|---|---|---|
| 3,823,863 A * | 7/1974 | Piechocki | ......... | H01L 21/67144 228/212 |
| 4,420,676 A * | 12/1983 | Hirsch | ................... | B23K 9/038 219/126 |
| 4,480,165 A * | 10/1984 | Haushalter | .......... | B23K 1/0012 219/158 |
| 4,610,636 A * | 9/1986 | Craig | ....................... | H01J 9/00 228/49.1 |
| 5,108,023 A * | 4/1992 | Japichino | ............... | B23K 3/087 228/1.1 |
| 5,148,962 A * | 9/1992 | Jones | ................... | B23K 1/0056 228/49.1 |
| 5,193,733 A * | 3/1993 | You | .................... | H01L 21/4825 228/4.5 |
| 5,377,897 A * | 1/1995 | Zimmer | .................. | G12B 5/00 228/106 |
| 5,611,478 A * | 3/1997 | Asanasavest | ....... | H01L 21/4853 228/110.1 |
| 5,941,444 A * | 8/1999 | Sadler | .................. | B23K 1/0016 228/33 |
| 6,378,857 B1 * | 4/2002 | Taylor | ................ | H05K 13/0069 228/44.7 |
| 9,553,069 B2 * | 1/2017 | Han | ....................... | H01L 24/75 |
| 2001/0037862 A1 * | 11/2001 | Moriuchi | .............. | B23K 37/047 156/578 |
| 2005/0199678 A1 * | 9/2005 | Eisenhower, Jr. | . | B23K 37/0443 228/47.1 |
| 2008/0296353 A1 * | 12/2008 | Simmons | ........... | B23K 37/0443 228/176 |
| 2009/0014500 A1 * | 1/2009 | Cho | ..................... | B23K 37/047 228/102 |
| 2012/0031147 A1 * | 2/2012 | Arai | ................... | B23K 26/0057 65/182.2 |
| 2013/0181037 A1 * | 7/2013 | Nagai | ..................... | H01L 24/75 228/103 |

FOREIGN PATENT DOCUMENTS

| | | | | |
|---|---|---|---|---|
| CN | 201913346 U | | 8/2011 | |
| JP | 05121478 A | * | 5/1993 | ............. H01L 24/85 |
| JP | 06182588 A | * | 7/1994 | |

* cited by examiner

WELDING TRAY

TECHNICAL FIELD

The disclosure relates to a tray, and in particular to a welding tray.

BACKGROUND

Along with development of an electronic welding technology, there are more and more printed circuit boards with various connector interfaces, for example, a direct plug-in Universal Serial Bus (USB) data card. There are multiple connector forms, a common USB connector is shown in FIG. 1, and the connector is defined according to a USB standard interface structure. A USB connector is placed on a printed circuit board in a manner shown in FIG. 2, wherein L is a regulation length of the USB connector extending to a part below the printed circuit board.

In the related art, a connector is usually automatically mounted and welded onto a printed circuit board in a manual welding manner or by a Surface Mounted Technology (SMT). As shown in FIG. 2, a connector is partially exposed from an edge of the printed circuit board, four pins are required to be welded onto the printed circuit board by the SMT, and other two pins are directly plugged into through holes in the printed circuit board. When a wave crest welding is adopted for welding, abnormities such as sagging or upwarping of the USB connector may easily be caused by melting of soldering tin under a condition of insufficient support or excessive support to further cause high-proportion poor welding and bring troubles to subsequent assembling and maintenance, and FIG. 3 and FIG. 4 show upwarping and sagging of the USB connector in a welding process respectively; $\alpha$ in FIG. 3 is an upwarping angle, and $\beta$ in FIG. 4 is a sagging angle.

At present, a method for solving the above-mentioned problem is usually to temporally place a gasket below a connector on a welding tray to prevent displacement of the USB connector during reflow welding and wave crest welding. But such a method usually has the following problems of:

a poor effect, wherein conditions of sagging, upwarping or the like may still appear in the welding process;

a high cost, wherein such a tray is usually poor in universality, and different trays are required to support mounting processes of each product; according to a requirement of a current special tray on a material, a composite material with high temperature resistance and certain strength is usually adopted, such a tray usually costs 3,000 Yuan, a mounting line usually needs at least 10 trays, then tray cost is at least 30,000 Yuan, and if there are multiple mounting lines running, cost may be multiplied;

a undiversified function and a poor operability, wherein such a tray is difficult to control, and the special tray may not be applied to other projects, so that unnecessary expenditures in tray maintenance and storage are produced; and such a tray may not be accurately regulated according to practical heights of the printed circuit board and a welded device, so that a main board is likely to be skewed towards two sides after the wave crest welding.

SUMMARY

The technical problem to be solved by the embodiments of disclosure is to provide a welding tray, which may avoid a condition of sagging or upwarping of an outer edge of a connector in a welding process of the connector and a printed circuit board, and implement accurate regulation according to practical height sizes of the printed circuit board and a welded device to improve a welding quality and a universality of the connector and the printed circuit board.

In order to solve the technical problem, the embodiments of the disclosure provide a welding tray, which may include: a tray frame and a supporting device, wherein the supporting device includes a supporting component and an adjustable connecting component, and the supporting component includes a supporting surface; and the adjustable connecting component connects the supporting component to a side edge of the tray frame, and a distance between the supporting surface and a bearing surface of the tray frame is adjustable.

In an example embodiment, the tray frame includes a rectangular outer frame, and the outer frame includes two transverse supporting beams and two longitudinal supporting beams; the supporting component includes a supporting part with the supporting surface and two connecting parts positioned at two ends of the supporting part, and the two connecting parts include two connecting surfaces spaced from the supporting surface; and the adjustable connecting component connects the two connecting parts with the two transverse or longitudinal supporting beams respectively, and adjusts the distance between the supporting surface and the bearing surface of the tray frame by changing distances between the two connecting surfaces of the two connecting parts and the two supporting beams.

In an example embodiment, the adjustable connecting component includes a locking element and two screw studs; the two screw studs sequentially penetrate through through holes on the two connecting surfaces of the two connecting parts and through holes in the two supporting beams respectively; and the locking element locks the two connecting parts and the two supporting beams relative to the corresponding screw studs, and locking positions are adjustable.

In an example embodiment, the locking element includes springs which are arranged on the screw studs in a sleeving manner and positioned between the connecting surfaces of the connecting parts and the supporting beams, and further includes nuts which lock the supporting beams in cooperation with the springs.

In an example embodiment, a cross section of the supporting component is in a "⌐⌐" shape, wherein a middle part of the "⌐⌐" shape is the supporting part with the supporting surface, two bent connecting parts are arranged at the two ends of the supporting part, and the connecting surfaces of the two connecting parts are parallel to the supporting surface and lower than the supporting surface.

In an example embodiment, at least one group of positioning nails for limiting movement of a welding object is further arranged on the supporting surface of the supporting component, and each group of positioning nails includes at least two positioning nails.

In an example embodiment, further including a metal pressing bar, wherein pressing bar positioning columns are arranged on the metal pressing bar, and the metal pressing bar is fixed on pressing bar positioning holes in the two supporting beams through the pressing positioning columns.

In an example embodiment, the supporting surface is positioned above or below the bearing surface of the tray frame.

In an example embodiment, tray positioning holes are formed in transverse supporting beams, and the tray frame further includes reinforcement supporting bars.

In an example embodiment, the tray frame is used for bearing a printed circuit board; a material of the welding tray is a high-temperature-resistant material; and the supporting surface of the supporting component is used for supporting a connector which is required to be welded onto the printed circuit board and extends out of the printed circuit board.

According to the welding tray stated in the above-mentioned solution, the distance between the supporting surface of the supporting device and the bearing surface of the tray frame may be accurately adjusted according to a relative length of an extending part of the connector and the printed circuit board, so that the problem of sagging or upwarping of the connector during welding is effectively solved, and the high universality is achieved. Moreover, the welding tray is simple in structure and convenient to operate, cost may be effectively reduced, and the welding quality of the connector and the printed circuit board may be improved.

Embodiment 1

Figure 1:
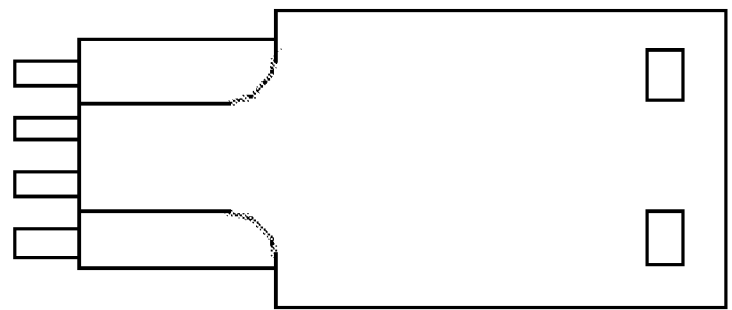
FIG. 1 is a schematic diagram of a connector.
Figure 2:
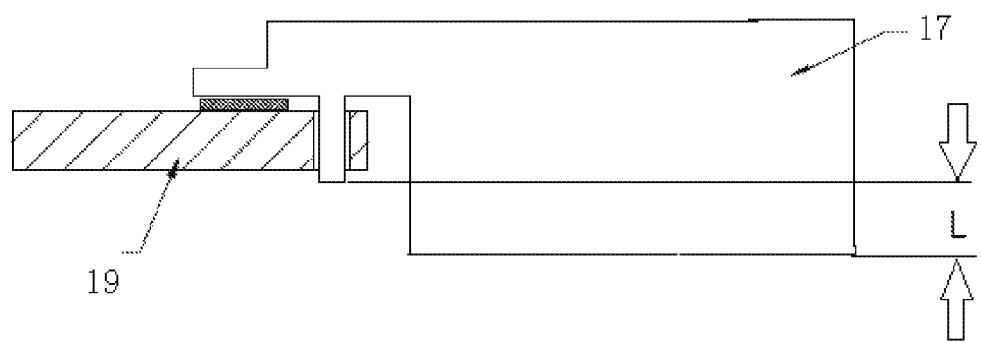
FIG. 2 is a schematic diagram of connection of a connector and a printed circuit board.
Figure 3:
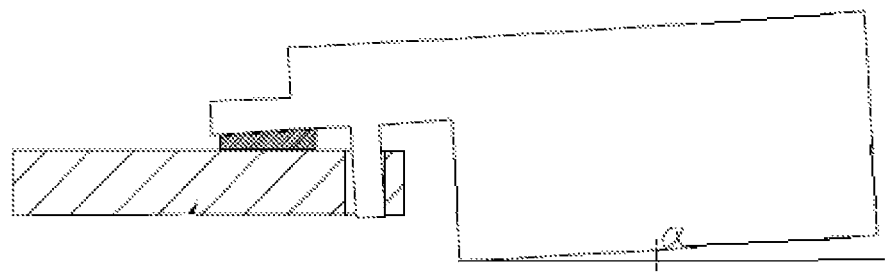
FIG. 3 and FIG. 4 are schematic diagrams of skewing of a connector after welding.
Figure 4:
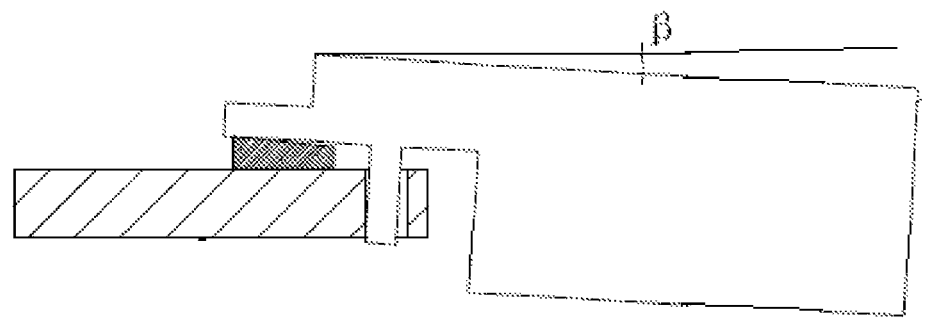

The embodiment of the disclosure is disclosed to solve the problem of sagging or upwarping of an outer edge of a connector in a welding process of the connector, wherein a USB interface or an interface of another type may be connected with one end of the connector, a welding tray of the embodiment of the disclosure is described in detail with a connector 17 shown in FIG. 2 as an example, and an extending part of the connector 17 in FIG. 2 is positioned below a printed circuit board 19.

Figure 5:
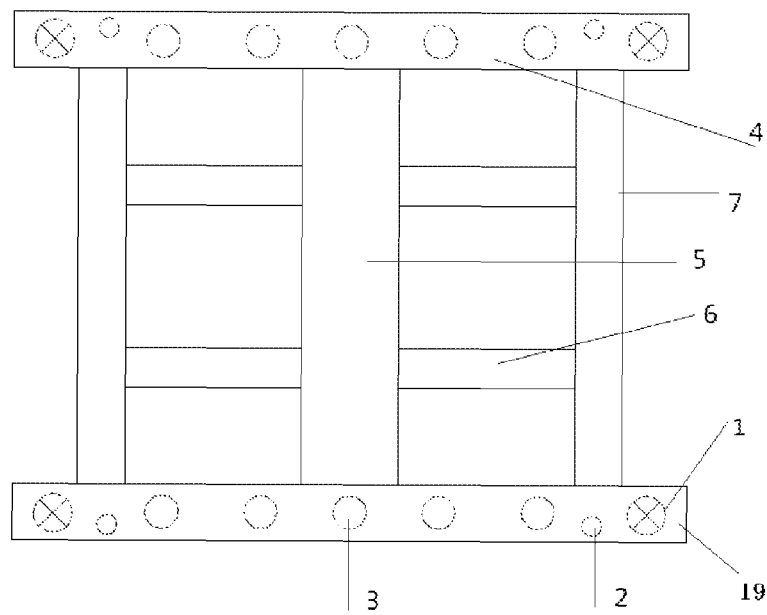
FIG. 5 is a top view of a structure of a tray frame according to a first embodiment.
Figure 6:
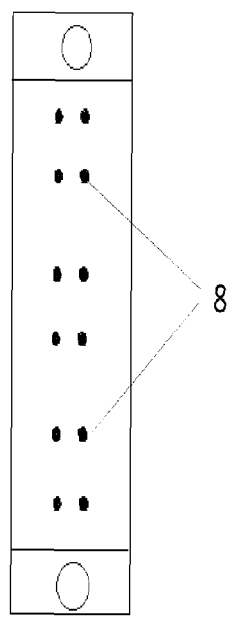
FIG. 6 is a top view of a supporting device according to a first embodiment.
Figure 7:
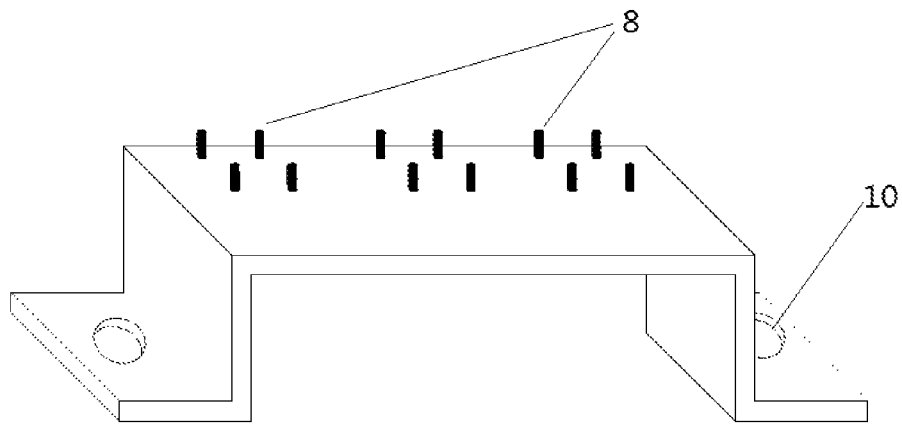
FIG. 7 is a side view of a supporting device according to a first embodiment.
Figure 8:
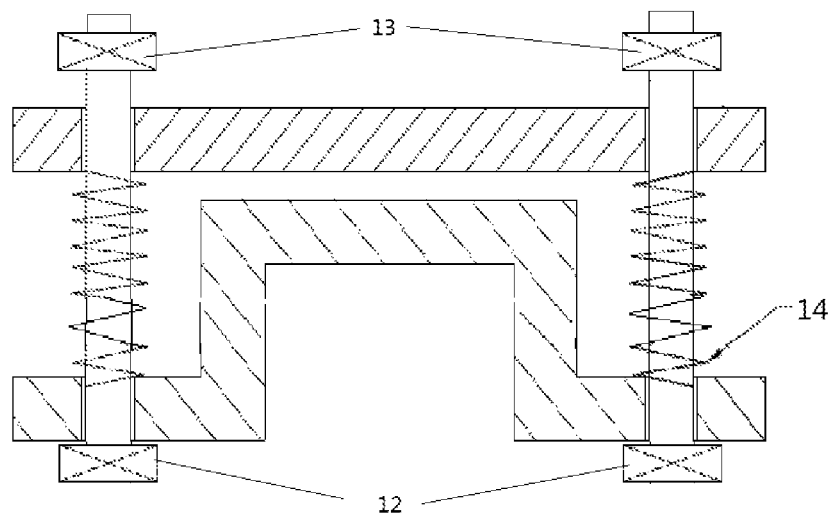
FIG. 8 is an overall structural schematic diagram of a welding tray according to a first embodiment.

FIG. 5 is a top view of a structure of a tray frame according to a first embodiment; FIG. 6 is a top view of a supporting device according to a first embodiment; FIG. 7 is a side view of a supporting device according to a first embodiment; FIG. 8 is an overall structural schematic diagram of a welding tray according to a first embodiment; and as shown in FIG. 5 to FIG. 8, the welding tray provided by the embodiment includes a tray frame 18 and a supporting device 16, the tray frame 18 is arranged to bear the printed circuit board and an overall structure of the welding tray may be made from a high-temperature-resistant material such as a metal.

The supporting device 16 includes a supporting component and an adjustable connecting component.

The supporting component includes a supporting surface, and the supporting surface of the supporting component is arranged to support the connector 17 which is required to be welded onto the printed circuit board and extends out of the printed circuit board. The supporting component includes a supporting part with the supporting surface and two connecting parts positioned at two ends of the supporting part, and the two connecting parts include two connecting surfaces spaced from the supporting surface. The adjustable connecting component connects the supporting component to a side edge of the tray frame 18, and a distance between the supporting surface and a bearing surface of the tray frame 18 is adjustable.

The tray frame 18 includes a rectangular outer frame, and the outer frame includes two transverse supporting beams 4 and 19 and two longitudinal supporting beams 5 and 7.

| Descriptions about drawing reference signs | |
|---|---|
| 1-a through hole in a supporting beam | 2-a pressing bar positioning hole |
| 3-a tray positioning hole | 4, 19-a transverse supporting beam |
| 5, 7-a longitudinal supporting beam | 6-a reinforcement supporting bar |
| 8-a positioning nail | 9-a pressing bar positioning column |
| 10-a through hole in a connecting surface of a supporting device | 12-a screw stud |
| 13-a nut | 14-a spring |
| 15-a metal pressing bar | 16-a supporting device |
| 17-a connector | 18-a tray frame |
| 19-a printed circuit board | α-a schematic sagging angle of a connector |
| β-a schematic upwarping angle of a connector | |
| L-a adjustment length of a connector below a printed circuit board | |
| M-adjustment length of connector above printed circuit board | |

DETAILED DESCRIPTION

In order to make the purpose, technical solution and advantages of the disclosure clearer, embodiments of the disclosure will be described below with reference to the drawings in detail. It needs to be noted that the embodiments in the disclosure and characteristics in the embodiments may be freely combined under the condition of no conflict.

The adjustable connecting component connects the two connecting parts with the two transverse or longitudinal supporting beams respectively, and adjusts the distance between the supporting surface and the bearing surface of the tray frame 18 by changing distances between the connecting surfaces of the two connecting parts and the two supporting beams.

In an example embodiment, the distance may be determined according to a length of the connector extending to a part below the printed circuit board 19, and is namely determined according to L in FIG. 2.

In a practical operating process, the printed circuit board 19 is placed on the tray frame 18, the tray frame 18 is used for supporting the printed circuit board 19, an exposed part of the connector 17 is arranged on the supporting surface of the supporting component, the distance between the supporting surface and the bearing surface of the tray frame 18 is set according to the length L of the connector extending to the part below the printed circuit board 19, and the tray frame may be accurately adjusted to prevent sagging or upwarping of the connector in a welding process according to a practical condition.

In an example embodiment, the adjustable connecting component includes a locking element and two screw studs 12, the two screw studs 12 sequentially penetrate through through holes 10 in the connecting surfaces of the two connecting parts and through holes 1 in the two supporting beams respectively, and the supporting beams with the through holes are usually two opposite supporting beams. The locking element locks the two connecting parts and the two supporting beams relative to the corresponding screw studs 12, and locking positions are adjustable.

For different types of connectors, thicknesses of exposed parts of the connectors are also different and heights of the connectors extending to the part below the printed circuit board 19 are also different, so that the distance between the supporting surface and the bearing surface of the tray frame 18 may be adjusted for different types of connectors. The aim of adjusting the distance between the supporting surface and the bearing surface of the tray frame 18 may be fulfilled to achieve adaptability of the tray frame 18 to connectors of different thicknesses and endow the tray frame 18 with the high universality by adjusting positions of the locking element and the screw studs 12.

In an example embodiment, the locking element includes springs 14 which are arranged on the screw studs 12 in a sleeving manner and positioned between the connecting surfaces of the connecting parts and the supporting beams and nuts 13 which are matched with the springs 14 to lock the supporting beams.

In another embodiment, other elastic components may also be used instead of the springs 14. The elastic components such as the springs 14 are arranged on the screw studs 12 in the sleeving manner, so that a more ideal adjustment effect may be achieved, and a better attachment effect of each part after adjustment may be achieved. In addition, in another embodiment, each connecting part may also be locked by a nut (matched with a screw stud head), and each supporting beam may be locked by two nuts.

In an example embodiment, a cross section of the supporting component is in a "⌐⌐" shape, a middle part of the "⌐⌐" shape is the supporting part with the supporting surface, two bent connecting parts are arranged at the two ends of the supporting part, and the connecting surfaces of the two connecting parts are parallel to the supporting surface and lower than the supporting surface.

At least one group of positioning nails 8 for limiting movement of a welding object is further arranged on the supporting surface of the supporting component, each group of positioning nails includes at least two positioning nails, at least one group of positioning nails 8 for fixing the welding object is further arranged on the supporting surface of the supporting component, and a gap between each group of connector positioning nails 8 is adapted to a width of the exposed part of the connector to fix the exposed part of the connector on the supporting beams. The connector positioning nails 8 may tighten and position the connector to be welded to prevent sliding and displacement during wave crest welding of the tray.

In an example embodiment, tray positioning holes 3 are formed in the transverse supporting beams, and multiple tray positioning holes 3 may be formed for positioning when the tray passes through a welding furnace. The tray frame 18 further includes reinforcement supporting bars 6.

When the welding tray in the embodiment is applied to welding of the connector with an interface such as the USB interface and the printed circuit board 19, the distance between the supporting surface and the bearing surface of the tray frame 18 is accurately adjusted according to the adjustment length of the connector extending to the part below the printed circuit board 19, so that the connector and the printed circuit board 19 are wholly in a relatively parallel state, skewing towards two sides is prevented, and the problems of low adjustment accuracy and poorer universality of an existing tray are solved.

The schematic diagram of structure and mounting of the welding tray of the embodiment will be described below with reference to the drawings in detail.

As shown in FIG. 5 to FIG. 8, the welding tray includes the tray frame 18 with a rectangular structure, and the tray frame 18 is provided with the transverse supporting beams 4 and 19 and the longitudinal supporting beams 5 and 7. The supporting device 16 has a "⌐⌐" shaped structure, and a through hole 10 is formed in each of two ends for penetration of the corresponding screw stud 12. The connector positioning nails 8 corresponding to each connector are arranged on the supporting surface of the "⌐⌐"-shaped supporting device 16, and the positioning nails 8 are made from high-temperature-resistant metal and used for fixing the connector 17 to prevent the connector 17 from being displaced under the action of surface tension produced by high-temperature melting of soldering tin. Widths of the positioning nails 8 for the connector 17 may be determined with reference to a practical width of the connector 17, and each group of positioning nails 8 includes at least two positioning nails.

The supporting device 16 is placed below left and right ends of the rectangular tray frame 18, so that the through holes 10 in the connecting surfaces of the supporting device are aligned with the through holes 1 in the supporting beams of the tray frame 18.

A height of the supporting device 16 is determined according to a relative height of the welded connector and printed circuit board 19. The elastic components may be pressed or released to adjust distances between the supporting beams and the tray frame 18 by screwing the nuts 13. In the embodiment, the exposed part of the connector is lower than the printed circuit board 19, and the height is set to be adapted to the position height L of the connector according to an adjustment method shown in FIG. 5.

By the solution, the distance between the supporting surface of the supporting device 16 and the bearing surface of the tray frame 18 may be accurately regulated, so that the problem of sagging or upwarping of the connector during welding is completely solved.

Embodiment 2

Figure 9:
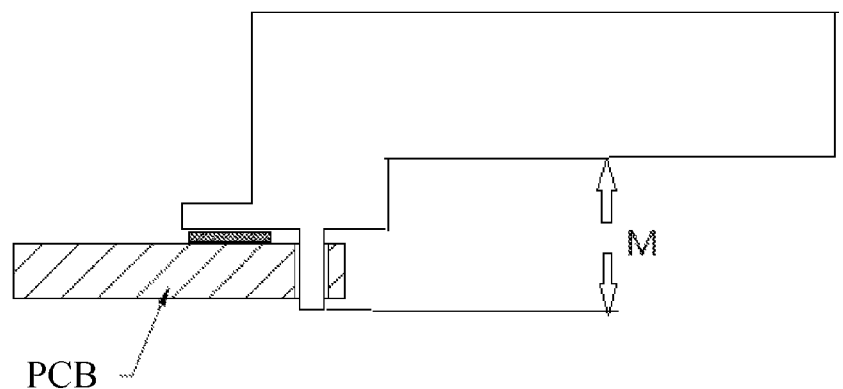
FIG. 9 is a schematic diagram of connection of a connector and a printed circuit board according to a second embodiment.

FIG. 9 is a schematic diagram of connection of a connector and a printed circuit board according to a second embodiment; and a connector shown in FIG. 9 is taken as an example in the embodiment, the embodiment is similar to embodiment 1, and has all the functions those embodiment 1 has, and the same parts will not be elaborated herein.

The difference with embodiment 1 is that the extending part of the connector is positioned above the printed circuit board 19, M in FIG. 9 is a adjustment length of the extending part of the connector and the printed circuit board 19, and in the embodiment, the distance between the supporting surface of the supporting device 16 and the bearing surface of the tray frame 18 is adjusted according to M.

Figure 10:
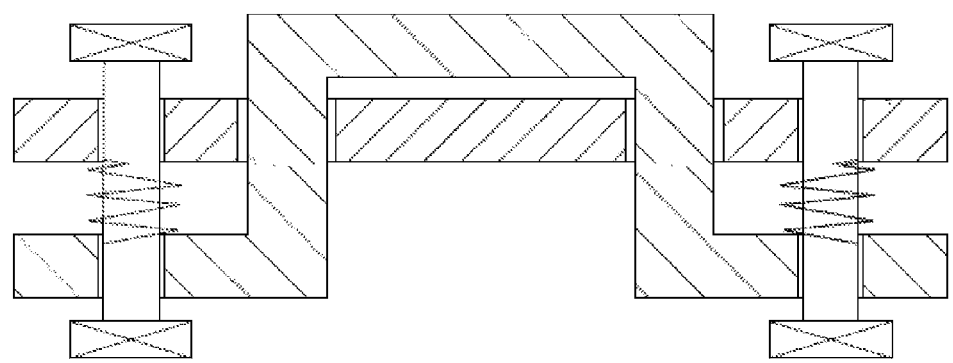
FIG. 10 is an overall structural schematic diagram of a welding tray according to a second embodiment.

FIG. 10 is an overall structural schematic diagram of a welding tray according to a second embodiment; and as shown in FIG. 9 and FIG. 10, the supporting surface of the supporting device 16 may be adjusted to be above the bearing surface of the tray frame 18, and may also be adjusted to be below the bearing surface of the tray frame 18. When the supporting device 16 is adjusted, it is necessary to ensure that the tray frame 18 has an enough gap for the supporting device 16 to move up and down to enable the supporting surface of the supporting device 16 to be positioned above or below the bearing surface of the tray frame 18.

From embodiment 1 and embodiment 2, it can be seen that a vertical height of the supporting surface of the supporting device 16 may be accurately adjusted by measuring the heights L and M of the connector relative to the printed circuit board 19 and adjusting the locking element and the two screw studs 12, and meanwhile, the springs 14 arranged on the screw studs 12 in the sleeving manner may attach the adjusted parts more firmly, so that the problems of sagging, upwarping and the like of the connector during welding are solved. The adjustable distances L and M may be measured according to the height of the connector relative to the printed circuit board 19, so that accurate control is completely implemented. In addition, the positioning nails 8 on the supporting device 16 prevent leftward and rightward displacement of the connector during wave crest welding or reflow welding and well ensure a welding effect of the connector.

Embodiment 3

Figure 11:
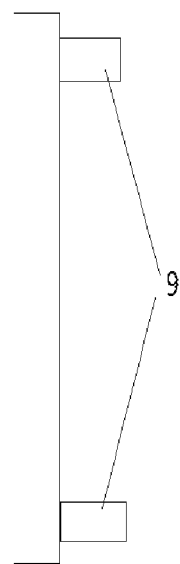
FIG. 11 is a side view of a metal pressing bar according to a third embodiment.

FIG. 11 is a side view of a metal pressing bar according to a third embodiment; and as shown in FIG. 11, the welding tray of the embodiment further includes a metal pressing bar 15, a pressing bar positioning column 9 is arranged on the metal pressing bar 15, and the metal pressing bar 15 is fixed on pressing bar positioning holes in the two supporting beams through the pressing positioning column 9.

Figure 12:
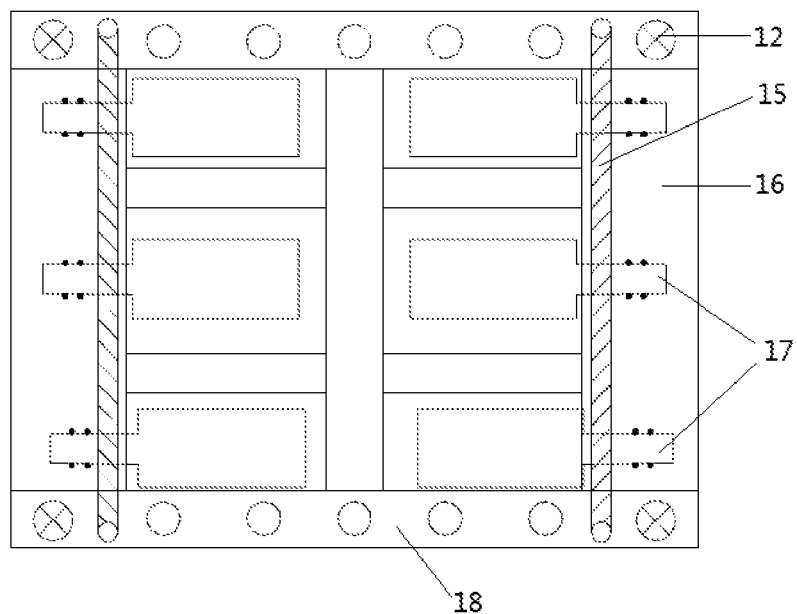
FIG. 12 is an overall mounting schematic diagram of a connector, a printed circuit board and a welding tray according to a third embodiment.

FIG. 12 is an overall mounting schematic diagram of a connector, a printed circuit board and a welding tray according to a third embodiment; and as shown in FIG. 12, during practical operation, the printed circuit board 19 is placed on the tray frame 18, the part, required to be welded with the printed circuit board 19, of the connector is placed on the printed circuit board 19, the extending part of the connector is placed on the supporting device 16, then the metal pressing bar 15 is pressed above the part, welded with the connector, of the printed circuit board, and is fixed on the pressing bar positioning holes in the supporting beams 4 and 19 of the tray frame 18 through the pressing bar positioning column 9 arranged on the metal pressing bar 15, and certain gaps for positioning the metal pressing bar 15 are required to be formed in the vicinity of the pressing bar positioning holes. The metal pressing bar 15 is additionally arranged, so that the connector is more stable in the welding process, and abnormities such as sagging and upwarping caused by position displacement are avoided.

From the drawings and text descriptions, the welding tray of the embodiments of the disclosure is convenient to operate, operation requirements on an operator are simplified, meanwhile, pressing positions of connectors on multiple printed circuit boards which are spliced may be completely ensured to be consistent, and shortcomings of a machining process for a printed circuit board with a connector may be effectively overcome. In addition, the welding tray of the embodiments of the disclosure may be correspondingly adjusted according to different conditions of the extending part of the connector relative to the printed circuit board, so that certain universality is ensured, and the problem of non-universality of an existing solution is solved.

The above is only the example embodiments of the disclosure and not intended to limit the disclosure, and for those skilled in the art, the disclosure may have various modifications and variations. Any modifications, equivalent replacements, improvements and the like made within the spirit and principle shall fall within the scope of protection of the disclosure.

INDUSTRIAL APPLICABILITY

According to the welding tray of the embodiments of the disclosure, the distance between the supporting surface of the supporting device and the bearing surface of the tray frame may be accurately adjusted according to the relative length of the extending part of the connector and the printed circuit board, so that the problem of sagging or upwarping of the connector during welding is effectively solved, and the high universality is achieved. Moreover, the welding tray is simple in structure and convenient to operate, cost may be effectively reduced, and the welding quality of the connector and the printed circuit board may be improved.

What is claimed is:

1. A welding tray, comprising:
   a tray frame and a supporting device, wherein
   the supporting device comprises a supporting component and an adjustable connecting component, and the supporting component comprises a supporting surface; and
   the adjustable connecting component connects the supporting component to a side edge of the tray frame, and a distance between the supporting surface and a bearing surface of the tray frame is adjustable;
   wherein the tray frame comprises a rectangular outer frame, and the outer frame comprises two transverse supporting beams and two longitudinal supporting beams;
   the supporting component comprises a supporting part with the supporting surface and two connecting parts positioned at two ends of the supporting part, and the two connecting parts comprise two connecting surfaces spaced from the supporting surface; and
   the adjustable connecting component connects the two connecting parts with the two transverse or longitudinal supporting beams respectively, and adjusts the distance between the supporting surface and the bearing surface of the tray frame by changing distances between the two connecting surfaces of the two connecting parts and the two supporting beams;
   wherein the adjustable connecting component comprises a locking element and two screw studs;
   the two screw studs sequentially penetrate through through holes on the two connecting surfaces of the two connecting parts and through holes in the two supporting beams respectively; and the locking element locks the two connecting parts and the two supporting beams relative to the corresponding screw studs, and locking positions are adjustable.

2. The welding tray as claimed in claim 1, wherein
the locking element comprises springs which are arranged on the screw studs in a sleeving manner and positioned between the connecting surfaces of the connecting parts and the supporting beams, and further comprises nuts which lock the supporting beams in cooperation with the springs.

3. The welding tray as claimed in claim 1, wherein
a cross section of the supporting component is a substantially inverted U-shape, wherein a middle part of the inverted U-shape is the supporting part with the supporting surface, the invented U-shape comprising two bent connecting parts arranged at two ends of the supporting part, and wherein connecting surfaces of the two connecting parts are parallel to the supporting surface and lower than the supporting surface.

4. The welding tray as claimed in claim 1, wherein
at least one group of positioning nails for limiting movement of a welding object is further arranged on the supporting surface of the supporting component, and each group of positioning nails comprises at least two positioning nails.

5. The welding tray as claimed in claim 1, further comprising a metal pressing bar, wherein pressing bar positioning columns are arranged on the metal pressing bar, and the metal pressing bar is fixed on pressing bar positioning holes in the two supporting beams through the pressing positioning columns.

6. The welding tray as claimed in claim 1, wherein
the supporting surface is positioned above or below the bearing surface of the tray frame.

7. The welding tray as claimed in claim 1, wherein
tray positioning holes are formed in transverse supporting beams, and the tray frame further comprises reinforcement supporting bars.

8. The welding tray as claimed in claim 1, wherein
the tray frame is used for bearing a printed circuit board; a material of the welding tray is a high-temperature-resistant material; and the supporting surface of the supporting component is used for supporting a connector which is required to be welded onto the printed circuit board and extends out of the printed circuit board.

* * * * *